Patented Mar. 8, 1949

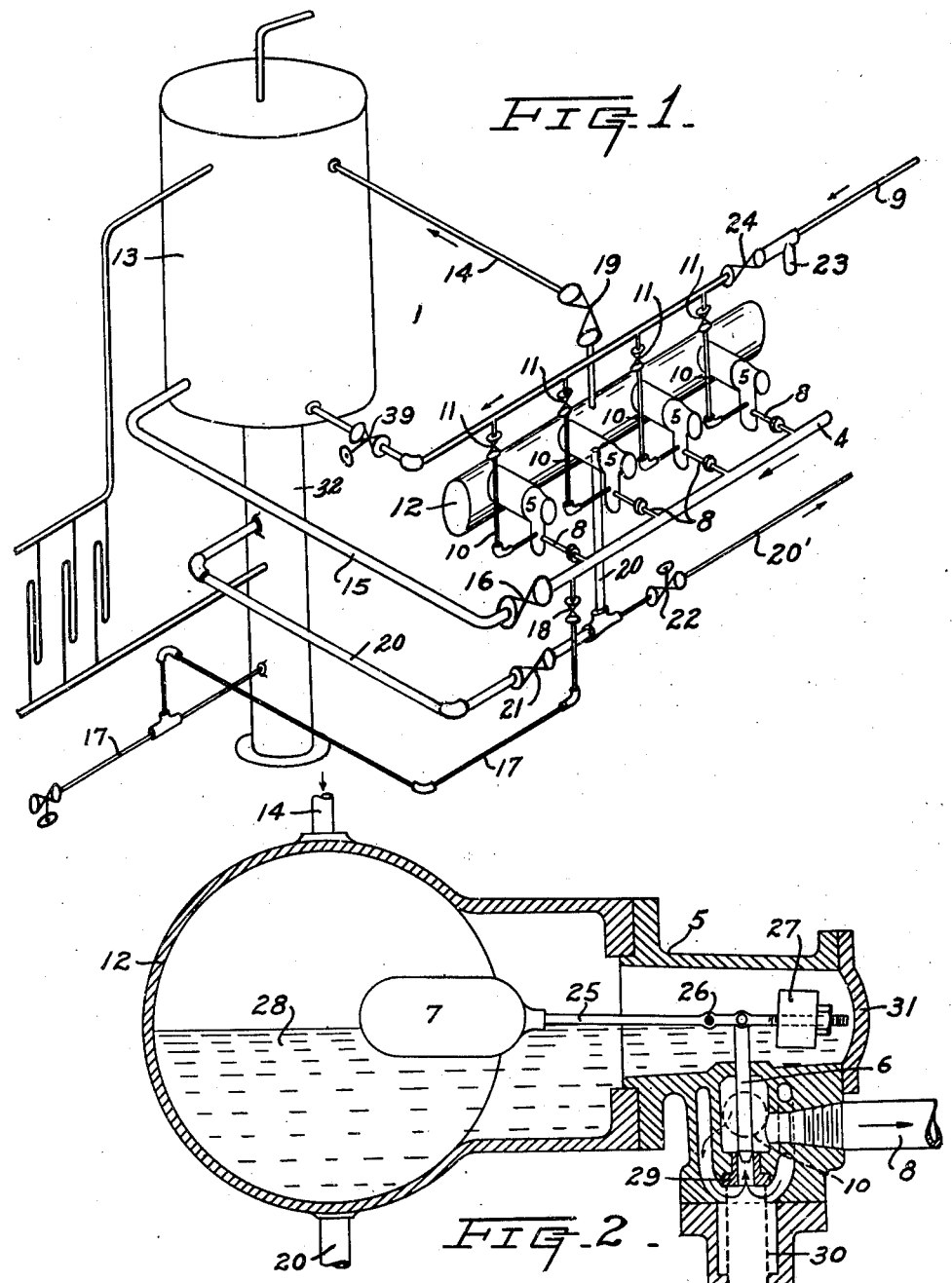

2,463,671

UNITED STATES PATENT OFFICE 2,463,671

REFRIGERANT FEED FOR MULTIPLE EVAPORATOR REFRIGERATING SYSTEMS

Charles G. Bach, Milwaukee, Wis., assignor to The Vilter Manufacturing Co., Milwaukee, Wis., a corporation of Wisconsin Application July 31, 1944, Serial No. 547,387

3 Claims. (Cl. 62—127)

This invention relates in general to improvements in the art of artificial refrigeration, and relates more specifically to improvements in the construction and operation of refrigerating systems utilizing volatile liquid refrigerants as cooling mediums.

The primary object of my invention is to provide a new and useful mode of controlling the flow of refrigerant to the cooling coils or evaporators of refrigeration installations having relatively large capacity.

It has heretofore been common commercial practice in the operation of various types of artificial refrigerating systems utilizing volatile refrigerant such as ammonia, to use float controlled valves for regulating the delivery of refrigerant to the cooling units or evaporators. These float valves are ordinarily opened and closed by a float riding upon a liquid bath, and may be adjusted so as to function most effectively in order to meet various operating conditions. When such float actuated control valves are used in conjunction with systems having relatively large capacity, they must be made of relatively large size in order to insure an abundant supply of refrigerant for the evaporators, and these large float valves besides being of special and costly construction, do not provide accurate and sensitive feeding or delivery of the liquid refrigerant. I have discovered that by employing two or more relatively simple, inexpensive, and considerably smaller standard float actuated valves in place of a single large and special valve heretofore used; and by causing the smaller float valves of the group to function successively as required, more efficient and reliable regulation is made possible at considerably lower cost.

It is therefore a more specific object of the present invention to provide an improved float valve controlled refrigeration system, wherein a plurality of relatively standard float valves are cooperable with volatile refrigerant supply and distribution lines to insure most effective and accurate feeding of the cooling units or evaporators at all times.

Another specific object of this invention is to provide an exceedingly reliable and flexible system for insuring abundant and rapid feeding of variable quantities of refrigerant to refrigeration installations having large capacity, and wherein volatile refrigerants are utilized as cooling mediums.

A further specific object of my invention is to provide an improved multiple float actuated valve feeding system for large artificial refrigeration units, which will function most efficiently and economically in accordance with the demand for refrigerant by the evaporators.

Still another specific object of the invention is to provide a new and useful refrigerant feeding assemblage especially adapted for use with refrigerating systems having relatively large capacity, and which may be readily applied at moderate cost to existing installations.

These and other specific objects and advantages will appear from the following detailed description.

A clear conception of an embodiment of the invention, and of the mode of constructing and operating systems assembled in accordance therewith, may be had by referring to the drawing accompanying and forming a part of this specification wherein like reference characters designate the same or similar parts in the two views.

Fig. 1 is an isometric perspective diagram of a float valve controlled refrigeration system utilizing my invention; and Fig. 2 is a somewhat diagrammatic and enlarged sectional view through a typical float actuated refrigerant supply valve such as may be advantageously used in my improved system.

While the invention has been shown and described herein as having been applied to a typical refrigeration installation utilizing four float valve units and ammonia as a refrigerant, it is not my desire or intent to unnecessarily restrict the scope or utility of the improvement by virtue of this limited or specific embodiment.

Referring to the drawing, the improved refrigeration system shown, comprises in general, a refrigerant discharge header 4 one end of which is sealed while its opposite end is connected by a pipe 15 with the lower portion of an accumulator of considerable capacity having a liquid confining leg 32 connected with any number of evaporators not shown; a series or group of four similar and relatively standard float valve assemblages 5 each having a valve 6 operable by a float 7 and a discharge pipe or line 8 connected to the common discharge header 4; a single fresh liquid refrigerant supply pipe 9 which is connected to the valve assemblages 5 by means of individaul pipes or feed lines 10 each having a manually operable shut-off valve 11 therein, and which is also communicable with the main accumulator 13 past a manually operable normally closed valve 39; a common float chamber or drum 12 for confining a quantity of liquid refrigerant upon which the floats 7 are adapted to ride or rest; and the large accumulator 13 for refrigerant, having a gas equalizing pipe 14 connected to the float chamber of the drum 12, and also being provided with a suitable refrigerant inlet connected to the suction side of the coolers or evaporators in the usual manner.

The main refrigerant discharge header 4 is communicable through the relatively large pipe 15 and a manually operable stop valve 16, to the lower liquid basin of the accumulator 13; and this header 4 may also be provided with a smaller oil drain or blow-off line 17 also communicating with the accumulator leg 32 and having a normally closed shut-off valve 18 therein, in several locations if necessary. The upper relatively small gas equalizing pipe 14 which connects the gas chamber of the accumulator 13 with the float chamber or drum 12, also has a normally open manually operable valve 19 therein; and the lower portions of the accumulator 13 and of the float drum 12, are provided with a liquid level equalizing pipe 20 having valves 21, 22 therein of which the valve 21 is normally open while the valve 22 is normally closed to seal off a blow-out connection 20'. The liquid refrigerant supply line 9 for the float valve assemblages 5, has a strainer 23 and a flow control valve 24 therein, and this supply line 9 does not communicate directly with the interior of the float confining drum 12 or with the accumulator 13, but merely connects with the valve assemblages 5 through the individual feed lines 10. The equalizing pipe 14 cooperates with the pipe 20 so as to constantly maintain the level of the liquid refrigerant in the accumulator 13 and drum 12 the same, and the valves 16, 19, 21 should therefore be normally open.

As previously indicated, the four float valve assemblages 5 are of similar and relatively standard construction, and the float 7 and valve 6 of each of these assemblages are connected by a lever 25 having a fulcrum pivot 26 and an adjustable weight 27 associated therewith, as shown diagrammatically in Fig. 2. These levers 25 are swingable about their pivots 26 as the floats 7 rise and fall in accordance with variations in the level of the liquid bath 28 within the common chamber 12, and the needle valves 6 coact with seats 29 which are interposed between the supply and discharge lines 10, 8 respectively of the individual assemblages 5. The supply lines 10 communicate with the seats 29 through strainers 30; and when the floats 7 drop or fall to lower levels due to lowering of the liquid level of the bath 28, the valves 6 will tend to open, whereas rising of the floats 7 due to increase in this liquid level will tend to close the valves 6. The weight 27 associated with each valve actuating lever 25 may however be adjusted to modify the action of the corresponding float 7 and to thereby control the opening and closing of each needle valve 6, and such adjustment may be made by removing the end closure caps 31 of the individual valve assemblages 5. These individual float valve assemblages 5 have long been used singly and of appropriate capacities for controlling the delivery of refrigerant to coolers or evaporators, and the fulcrum levers 25, pivots 26, and valves 6 are shown diagrammatically only.

In accordance with my present invention, I associate a plurality of these relatively standard float valve assemblages 5 with a common actuating drum 12 having therein a single bath 28 of liquid, and with common refrigerant supply and discharge pipes or lines 9, 4 respectively, so that the total capacity of the combined valve assemblies 5 will abundantly meet the maximum demand of the evaporators when all of the valves 6 are wide open. I then cause the individual valves 6 to open or close successively so as to deliver only the correct amount of refrigerant to the discharge line 4, corresponding to the varying demand, and this type of control with the aid of a group of regulating valves will permit the use of smaller and more sensitive float valves and will also insure more accurate and reliable feeding. The desired successive opening and closing of the valves 6 may be accomplished either by positioning the successive valve assemblages 5 of the group at successively higher elevations while all of the control valve mechanisms are correspondingly initially set or adjusted; or by initially adjusting the individual valves 6 so as to open successively or to close successively as the liquid level in the bath 28 drops or rises. The positioning of the successive valve assemblages 5 so as to cause the successive similarly adjusted or preset valves 6 to open successively and to close successively, may be obtained by merely tilting or inclining the horizontal axis or central longitudinal transverse plane of the drum 12 slightly, so that the floats 7 of the successive valves will open the valves 6 to different extents. In other words, the effective level of the liquid in the bath 28 at the lowermost of the group of valves 6 will close these lowermost valves to a greater extent than is done by the same liquid level acting upon the highermost of the series of valves 6.

During normal operation of the improved refrigeration system, the common float actuating chamber 12 will constantly be supplied with liquid refrigerant, and the valves 11, 24 will be open so as to permit liquid refrigerant to enter the valve assemblies 5. The valves 18, 22 will be closed and the valves 16, 19, 21 should be open in order to maintain the same level of liquid refrigerant within the accumulator 13 and in the drum 12. As the demand for liquid refrigerant within the common header pipe 4 varies due to varying demand by the evaporators or coolers, more or less liquid refrigerant will be admitted to the pipes 8 from the pipes 10 which communicate with the supply line 9. When the demand for liquid refrigerant by the evaporators is low, the liquid level within the bath 28 as determined by the accumulator 13, will be relatively high and in that case three of the four valves 6 may be closed while only one of these valves will be admitting refrigerant to the header 4. As the demand increases, the initially opened valve 6 will open wide and the next successive valve 6 will open so as to admit more refrigerant to the header 4 and coolers. A further increase in the demand will cause the two initially opened valves 6 to open wide and will also cause the third valve 6 to come into action; whereas maximum demand for refrigerant by the evaporators will result in wide opening of the first three valves 6 and regulation by the fourth and last of these valves 6. As the demand for refrigerant is reduced, the last of the valves 6 to open, will be the first to close, and the successive valves 6 will close and remain closed as the demand for refrigerant is further diminished. In this manner thoroughly reliable, sensitive and efficient control of the delivery of refrigerant from the supply line 9 to the header 4, is obviously obtained and the same regulation will be effected whether the chamber 12 is inclined or whether the individual valves 6 are pre-set with the aid of the weights 27 so as to produce successive functioning of these valves in a similar manner.

From the foregoing detailed description it will be apparent that my present invention provides a simple but highly efficient system for accurately and reliably regulating the delivery of refrigerant to the evaporators, especially in large refrigeration systems wherein considerable volume of refrigerant is fed. The group of similar relatively simple and standard float valve assemblages 5 is flexible and exceedingly sensitive in its operation, and functions to feed the refrigerant to the evaporators precisely in accordance with the demand, and if the evaporator capacity is diminished, one or more of the assemblies 5 may easily be cut out of the system by manipulating the valves 11 thereof. While the valve assemblies 5 may be readily positioned at different elevations by merely slightly inclining the common float control drum 12, approximately the same results may be accomplished by other methods herein referred to, and the improved regulating system has in fact proven highly successful and advantageous in actual commercial use. The system may moreover be readily applied to existing refrigeration installations, by utilizing standard float control valves and pipe fittings, and insures most economical and efficient operation of the installations to which it is applied.

It should be understood that it is not desired to limit this invention to the exact details of construction or to the precise mode of operation, herein shown and described, for various modifications within the scope of the appended claims may occur to persons skilled in the art.

I claim:

1. A refrigeration system, comprising, two or more evaporators, an accumulator arranged to contain an abundance of liquid refrigerant, means providing a liquid refrigerant basin in open communication with said accumulator, means for constantly equalizing the liquid levels in said accumulator and basin, a source of liquid refrigerant other than said basin, and a plurality of liquid refrigerant feed valves each actuated by an independent float responsive to changes in the level of the liquid in said basin, said floats being arranged to open said valves successively to deliver liquid refrigerant from said source to said evaporators through said accumulator.

2. A refrigeration system, comprising, two or more evaporators, an accumulator arranged to contain an abundance of liquid refrigerant, means providing a liquid refrigerant basin in open communication with said accumulator, means for constantly equalizing the liquid levels in said accumulator and basin, a source of liquid refrigerant other than said basin, and a plurality of liquid refrigerant feed valves each actuated by an independent float responsive to changes in the level of the liquid in said basin, said feed valves being successively operable by variations in liquid level in said basin to increase or diminish the quantity of liquid refrigerant delivered from said source to said evaporators through said accumulator.

3. A refrigeration system, comprising, two or more evaporators, means providing an elongated liquid basin devoid of direct connections with said evaporators, an accumulator cooperating with said basin to vary the liquid level in the basin in accordance with varying demands for refrigerant by said evaporators, a source of refrigerant supply for said evaporators devoid of direct connections with said basin, and a plurality of valves each independently operable by a float resting upon the liquid in said basin for controlling the delivery of refrigerant from said source to said evaporators through said accumulator.

CHARLES G. BACH.

REFERENCES CITED

The following references are of record in the file of this patent:

UNITED STATES PATENTS

| Number | Name | Date |
| --- | --- | --- |
| 783,878 | Lydon | Feb. 28, 1905 |
| 1,246,079 | Fox | Nov. 13, 1917 |
| 1,880,653 | Baars | Oct. 4, 1932 |
| 1,866,989 | Shipley | July 12, 1932 |